Jan. 9, 1951      A. STAUFFER      2,537,320

POTATO HARVESTER

Filed March 28, 1947

INVENTOR
ALFRED STAUFFER

BY

ATTORNEY

Patented Jan. 9, 1951

2,537,320

UNITED STATES PATENT OFFICE 2,537,320

POTATO HARVESTER

Alfred Stauffer, Honey Brook, Pa.

Application March 28, 1947, Serial No. 737,746

9 Claims. (Cl. 55—51)

This invention relates to harvesters for potatoes and similar tuberous and root crops and is especially directed to improved means for separating the potatoes from the soil in which they grow as well as from the vines and other unwanted plant parts and gathering them for bagging or depositing loose in an attending vehicle or other receptacle.

Potato harvesters heretofore known require constant attendance of operatives to exclude stones, clods of earth, vines and undersized tubers or roots from the harvested crop, some with which I am familiar necessitating individual manual picking of the desired potatoes from a conveyor while in others the foreign bodies instead of the potatoes are removed by hand, but none so far as I am aware can successfully harvest potatoes automatically and without including in the harvest excessive quantities of objectionable materials such as vines, stones and earth.

It is thus a principal object of my invention to provide a compact substantially automatic harvester for potatoes or the like which is relatively inexpensive to manufacture as well as to maintain and operate and which embodies improved means effective as the harvester moves along a row of plants to separate the potatoes from the earth, vines, stones and clods and deliver the former to a receptacle while returning the latter to the ground.

A further object is to provide an improved potato harvester which automatically digs, separates and delivers the crop to a receptacle substantially free from foreign bodies such as stones, clods, vines and undersized potatoes and so insures a crop yield of the highest grade warranted by the quality of the individual potatoes harvested.

A still further object is the provision of a potato harvester of the character aforesaid by the use of which the necessity of separating by hand the full sized potatoes from the undersized ones and accompanying trash is obviated, with consequent saving in labor cost per bushel of potatoes harvested and generally a material reduction in the time required therefor by the means and methods presently employed.

Other objects, purposes and advantages of the invention will hereafter more fully appear or will be understood from the following description of certain embodiments of it wherein reference will be had to the accompanying drawing in which.

Figure 1:
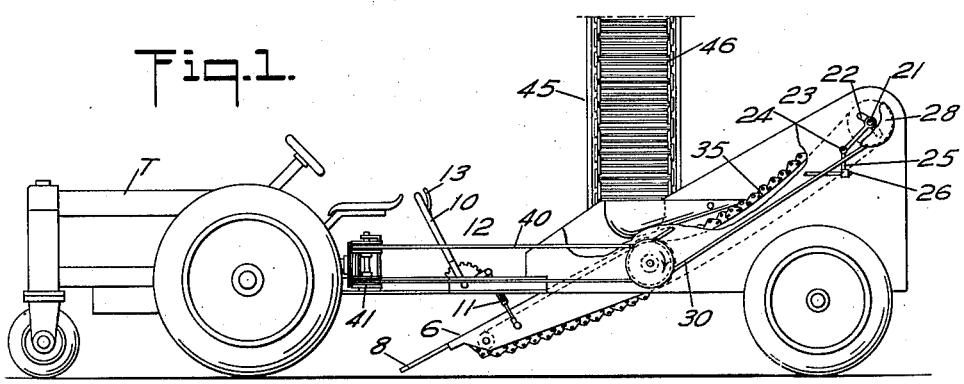
Fig. 1 is a fragmentary side elevation of a preferred embodiment of the harvester operatively assembled with a tractor.

In the following more particular description of the harvesters illustrated in the drawing, it will be understood I have shown in Fig. 1 of the latter and shall hereafter refer in greater detail to a conventional tractor and to the invention as it may be embodied in a separable trailer unit adapted to be drawn thereby and driven therefrom, but it will be understood it may be embodied as well in a single unitary self-contained automotive vehicle of the farm tractor type or may be constructed as a separable attachment for a tractor but adapted to be wholly supported as well as driven therefrom; in addition it may be constructed as a self-contained, self supporting unit designed to be merely drawn by draft animals or a tractor, and while I have referred to the capacity of the harvesters as shown for separating potatoes from the vines on which they have grown, it is normally advantageous to employ a primary weeder or other device for preliminarily removing at least a major portion of the vines and I usually prefer to use for this purpose mechanism embodying another invention which is described and claimed in my application for United States Letters Patent for Weeder for Potato Harvesters and the Like, Serial No. 749,777, filed May 22, 1947, now Patent No. 2,492,600.

Figure 2:
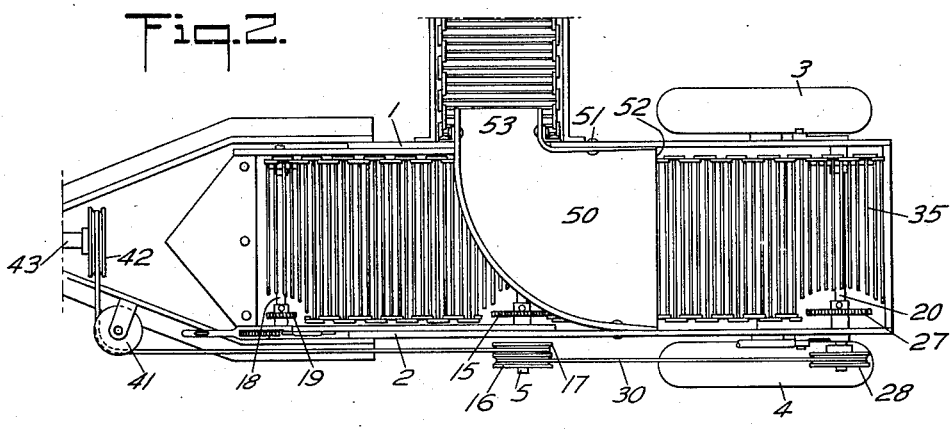
Fig. 2 is a fragmentary enlarged top plan view of the harvester unit alone.
Figure 3:
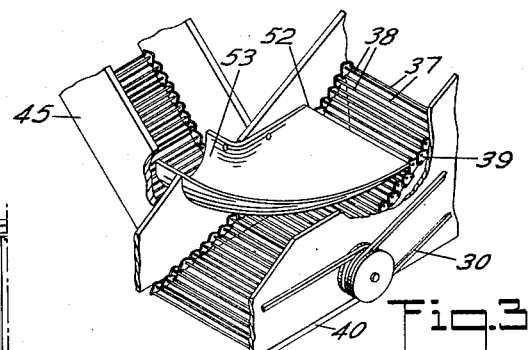
Fig. 3 is a fragmentary perspective showing the crop selecting and accumulating mechanism thereof.

Referring now more particularly to Figs. 1–3 of the drawing herein, the harvester illustrated, drawn by and driven from a tractor T, comprises in general composite side frame members 1, 2 rising toward their rear ends, suitably secured together in laterally spaced relation and converging at their front ends to a suitable hitch (not shown) whereby the frame is attached to the tractor and the harvester thereby progressively drawn along the row, the rear end of the frame being supported from a pair of wheels 3, 4.

Approximately midway longitudinally of the frame is a transverse shaft 5 journaled therein and pivotally supporting the rear end of a plow carrier 6 the forward end of which is provided with a pointed plow 8 which may be raised or lowered relatively to the frame about shaft 5 by manipulation of a lever 10 having an adjustable connection 11 with the carrier. A toothed quadrant 12 and a detent (not shown) controlled by a trigger 13 on the lever provide means for releasably locking the carrier in any selected position, that is with the plow above the ground when the harvester is not actually in use or entering the ground to a desired depth during harvesting operations.

In addition to supporting one end of the plow carrier the shaft 5 also carries a pair of sprockets 15 adjacent either side frame member, only one of such sprockets appearing in the drawing, and on an end of this shaft projecting outwardly beyond one of the frame members a pair of pulleys 16, 17 are secured, or a double pulley may be employed if preferred.

Extending transversely of the plow carrier 6 just in rear of plow point 8 is another shaft 18 carrying a pair of sprockets 19 and at the rear of the frame, elevated considerably above the ground level, is a third generally similar shaft 20 rotatable in movable bearings 21 slidable in arcuate slots 22 for adjusting its height above the ground and its relation to other parts of the harvester. The bearings 21 are supported from arms 23 secured to a bar 24 actuated by a crank 25 and rod 26 from a manually operable lever (not shown) arranged at any suitable point and adapted to rock bar 24 about its axis and thereby raise or lower shaft 20 in slots 22 as desired. Shaft 20 carries a third pair of sprockets 27 and on its projecting end in alignment with pulley 17 on shaft 5 is a pulley 28 connected to and driven from pulley 17 by a V-belt 30.

Over all the sprockets which have been mentioned there runs an endless crop conveyor belt 35 preferably constructed from two series of parallel metal rods 37, 38 connected at their extremities by generally triangular link plates 39 in such manner that rods 37 are spaced apart and form pivots for the plates and rods 38 alternate with and lie in a plane spaced from rods 37, the whole thus forming a belt having substantial overall thickness, but one highly permeable to relatively comminuted material such as loose soil, sand, small stones or undersized potatoes or the like and presenting transverse ridges and pockets which tend to retain larger objects such as marketable potatoes lying on the belt even when the latter slopes at a fairly steep angle.

Shaft 5, as mentioned, carries the two pulleys 16, 17 the latter driving shaft 20, whereby through the medium of sprockets 15 on shaft 5 cooperating with sprockets 27 on shaft 20, the belt is progressively driven when the shafts revolve so its upper run moves upward and rearward when the machine is in operation. The other pulley 16 on shaft 5 is driven by a V-belt 40 running over "mule" pulleys 41 disposed at the forward end of the frame and a driving pulley 42 on the power take-off or jack shaft 43 of the tractor.

The crop conveyor belt 35 receives the teeth of the several sprockets 15, 19 and 27 between its rods 37 adjacent plates 39 and a positive drive is thus insured even when the belt is relatively heavily loaded with the mass of earth and potatoes raised by the plow in its progress through the ground as the harvester moves along a row. The motion imparted to the belt by its drive, as well as to some extent the motion of the harvester as a whole tends to break up the earth mass fairly rapidly, however, and comminuted earth particles, very small potatoes stones and the like normally are loosened from the mass and fall through the belt to the ground soon after being deposited on it. But larger objects, such as the marketable potatoes, a residue, sometimes substantial, of the vines and the larger stones and clods remain on the belt and are carried upwardly and rearwardly thereon initially at a relatively small angle until they have passed the vertical plane of shaft 5. The belt in rear of this shaft is at a much steeper angularity, however, due to the elevated position of the sprockets 27 on shaft 20 with respect to sprockets 15 on shaft 5 and is desirably maintained fairly slack between these two pairs of sprockets. Consequently while as I have suggested rods 37, 38 in effect define transverse ridges and pockets which can retain the potatoes on the belt even when sloping at a fairly steep angle, the belt for an appreciable distance forward of sprockets 27 is adjusted to an angularity somewhat greater than the angle of repose of potatoes thereon, that is, greater than the angle at which they will be retained thereon of their own weight without falling forwardly as the belt moves to the rear. Consequently potatoes received on the belt cannot be carried thereby upwardly and rearwardly as far as sprockets 27 but automatically fall forwardly as that portion of the belt supporting them approaches the sprockets.

In determining the adjusted position of shaft 20 to produce the desired angularity of the belt between it and shaft 5 the effects of the motion of the harvester and resulting vibration should be taken into account as the angle of repose of the potatoes on the belt is less when the harvester is moving than when it is standing still but in any case the angularity should not be so great as to cause vine fragments, stones or clods on the belt to likewise fall forwardly and they are therefore normally retained on the belt until it passes over sprockets 27 when they then drop to the ground. Sometimes, however, stones and clods, particularly more or less rounded ones, do start to fall forwardly with the potatoes but usually some projection or other irregularity in their surfaces will ultimately catch in a ridge of the belt sufficiently to enable the latter to carry them as well to the rear of the harvester for discharge to the ground so that generally the only objects rolling or falling forwardly on the belt are the marketable potatoes and these are automatically collected from the conveyor and in the harvester shown in Figs. 1–3 are diverted to an inclined transfer conveyor 45 disposed at one side of it. This conveyor, the belt 46 of which is preferably similar in construction to belt 35, may be driven from shaft 5 by suitable gearing (not shown) or in any other convenient way and its function is to lift the potatoes to an elevated point for discharge into an attendant truck or other receptacle.

This collection and diversion is performed by an element 50 preferably made from laminated more or less flexible material of the kind now generally used for power transmission belts comprising a plurality of textile layers alternating with layers of rubber or the like all bonded together. This material, having a considerably smoother and more regular surface than that of the conveyor belt has a correspondingly less angle of repose and the potatoes therefore roll or slide along it, especially when assisted by the vibration resulting from the motion of the harvester, quite readily even when that portion of the element on which they are resting is only slightly inclined to the horizontal, and this property of the collecting element employed is essential whatever be its specific construction.

When formed from belting of the character of that to which reference has just been made, however, the element is attached by rivets 51 to the frame members and has a substantially flat relatively flexible rectilinear lip 52 at its rear edge which normally lightly contacts the crop conveyor 35 and forwardly from this lip the element is downwardly curved and progressively and transversely contracted to provide a fairly deep diversion chute 53 which projects beyond the side frame 1 and terminates just above the lower end of transfer conveyor 45, being inclined throughout toward its discharge mouth at an angle at least slightly greater than the angle of repose of the potatoes thereon.

It will be understood nevertheless the transfer conveyor may be omitted if desired and arrangements made for receiving the potatoes discharged from the chute directly into bags or other receptacles instead of their being carried thereto by the transfer conveyor but employment of the latter will usually be preferred, especially when large crops are harvested.

Figure 4:
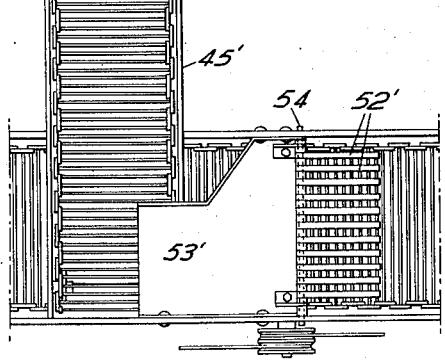
Fig. 4 is a fragmentary top plan view showing a modified embodiment of the invention.

In the modified embodiment of the invention illustrated in Fig. 4 the transfer conveyor 45', instead of terminating at the side of the harvester, extends across it over the crop conveyor 35 and a chute 53' which may be made of relatively rigid sheet metal is supported from the side frames above it. The potatoes are transferred to the chute from crop conveyor 35 by means of a plurality of elongated fingers 52' pivoted on a transverse shaft 54 adjacent the rear edge of the chute and inclining upwardly toward their free ends which normally rest lightly upon or just above crop conveyor 35, the inclination of the fingers and chute being preferably slightly greater than the angle of repose of the crop thereon. Fingers 52' thus in their function and operation correspond to lip 52 while chute 53' although not shaped to divert the potatoes to one side of the machine otherwise performs the same functions as chute portion 53 of the collecting element 50. The operation and effects of these several parts in the harvesting of potatoes will now be more fully described.

The harvester moves along the row of potato plants in the field in substantially the same manner as potato harvesters heretofore known, the weeder (not shown) disclosed in my said copending application or other appropriate means if provided removing most of the vines raised by the plow along with the potatoes before the latter on crop conveyor 35 reach its steeply angular rear portion while at least the major portion of the earth and other debris also raised by the plow meanwhile falls through the interstices between conveyor rods 37 and 38 as the potatoes, remaining vine fragments, large stones, clods and the like move upwardly and rearwardly. After they have passed sprockets 15 on shaft 5 where the angularity of the conveyor belt becomes steeper they pass under lip 52, or the ends of fingers 52', forming a gate which yields upwardly to permit their passage but returns immediately to normal position when not supported in an elevated one by an object on the conveyor. After the potatoes have passed the gate and are still moving rearwardly and upwardly, the increasing angularity of the belt causes them quickly to fall or roll forwardly and downwardly and they therefore soon pass onto the gate and into the discharge chute down which they roll to the subjacent transfer conveyor or to a suitable receptacle disposed at the end of the chute to receive them, any vine fragments, stones, clods, unmarketable potatoes and the like which also have passed under the gate remaining on the crop conveyor until they fall from its rear end to the ground.

The lip 52 preferably exerts a mild yielding pressure on crop conveyor belt 35 and thus tends to break up most clods of earth which reach its edge while the weight of fingers 52' in Fig. 4 enables them to perform a similar function, the broken particles then falling through the belt but clods which are not thus broken up and discharged, as well as stones and undersized potatoes too large to pass through the interstices of the belt do not roll on the belt so readily as the wanted potatoes and they as well as fragments of vines or the like are consequently retained on it without difficulty, even in the steeper portion of its upper run, until carried over its rear end. The marketable potatoes are thus automatically separated from the unwanted material and are alone received on and discharged from the chute in condition for further processing, grading or delivery to market.

While I have herein described with considerable particularity certain forms of the invention primarily designed for the harvesting of potatoes and have suggested certain modifications thereof suitable for employment in appropriate circumstances, it will be understood I do not desire or intend thereby to limit or confine myself in any way as the same principles may be utilized in harvesters for other crops and still other embodiments of the invention, and changes and modifications in the form, construction and relationship of their several parts will readily occur to those skilled in the art and may be made if desired without departing from the spirit and scope of the invention as defined in the appended claims.

Having thus described my invention, I claim and desire to protect by Letters Patent of the United States:

1. A harvester of the character described comprising a crop conveyor having a portion sloping at an angle greater than the angle of repose thereon of the crop to be harvested and crop collecting means extending over and closely adjacent said portion, sloping at a lesser angle to the horizontal, diverging forwardly from said portion at an acute angle thereto and comprising a discharge chute and means connected therewith for receiving from the conveyor the crop moving in opposition thereto and conducting said crop to the chute.

2. A potato harvester comprising a conveyor including a movable endless belt having interstices permeable to objects smaller than the potatoes to be harvested and means for depositing potatoes mixed with soil on said conveyor as the harvester moves along a row of potato plants, said conveyor having a lower relatively inclined portion and an upper more steeply inclined portion disposed at an angle greater than the angle of repose of said potatoes on the belt, a potato receiving element adjacent said upper portion lying normally proximate the belt and comprising a portion adapted to be raised by a potato moving with the conveyor, and to then return automatically to normal position after it is cleared by the potato and to receive potatoes moving along the conveyor by gravity in the opposite direction after passing the element, and a downwardly inclined portion operative to deliver the last mentioned potatoes to a discharge point.

3. A potato harvester comprising a conveyor including a movable endless belt having interstices permeable to objects smaller than the potatoes to be harvested and means for depositing potatoes mixed with soil on said conveyor as the harvester moves along a row of potato plants, said conveyor having a lower relatively inclined portion and an upper more steeply inclined portion disposed at an angle greater than the angle of repose of said potatoes on the belt, a potato receiving element adjacent said upper portion comprising an integral flexible body providing a lip extending transversely of the conveyor adjacent said upper portion and a chute inclined from said lip at an angle less than the angle of said upper portion but greater than the angle of repose on said body of said potatoes, said element being adapted to receive and discharge at a remote point potatoes moving over the lip from the upper portion of the conveyor in opposition to its direction of travel.

4. A potato harvester comprising a conveyor including a movable endless belt having interstices permeable to objects smaller than the potatoes to be harvested and means for depositing potatoes mixed with soil on said conveyor as the harvester moves along a row of potato plants, said conveyor having a lower inclined portion and an upper more steeply inclined portion disposed at an angle greater than the angle of repose of said potatoes on the belt, a potato receiving element adjacent said upper portion comprising a plurality of parallel pivoted fingers terminating adjacent said upper portion adapted to be moved on their pivots by potatoes being carried upwardly on the conveyor and to receive from the latter potatoes falling downwardly thereon after passing said fingers, and an inclined chute adapted to receive said last mentioned potatoes and direct them to a discharge point.

5. A potato harvester comprising a pair of spaced frame members, a rotatable shaft carried by the members extending transversely of the harvester, a pair of spaced sprockets on the shaft, a plow carrier extending forwardly and downwardly from the shaft having a plow at its forward end and a pair of sprockets in rear thereof aligned with but lower than said first mentioned sprockets, a third pair of sprockets carried by the frame members in rear of and higher than the first mentioned sprockets, means for lowering and elevating the third sprockets above the extended plane of the first and second sprockets, a permeable endless belt carried by all the sprockets adapted to receive soil and potatoes raised by the plow during progress of the harvester along a row of potato plants, means for driving at least one pair of the sprockets to thereby progressively carry the belt about all the sprockets to convey said potatoes rearwardly and upwardly while discarding soil particles through the belt, the belt between the first and second sprockets extending at an angle not greater than the angle of repose thereon of the potatoes to be harvested and between the first and third sprockets at an angle greater than said angle of repose, means carried by the frame above the belt between said first and third sprockets operative to receive potatoes moving by gravity along the belt in opposition to movement of the latter after said potatoes have passed said means during their upward movement with the conveyor, and an inclined chute adapted to conduct said last mentioned potatoes from said means to a discharge point.

6. A potato harvester comprising a pair of spaced frame members, an endless belt extending therebetween and permeable to objects of smaller size than the potatoes to be harvested, means for driving the belt, a plow adapted to discharge to the belt at its forward end potatoes and soil raised by the plow as it is drawn along the row, the belt rearwardly from said point of discharge extending upwardly at an angle less than the angle of repose of the potatoes thereon and thence more sharply upwardly at an angle greater than said angle of repose, means extending across the more sharply inclined portion of the belt forming a gate enabling potatoes to pass beneath it as they are carried upwardly by the belt and also forming receiving means for potatoes falling from the belt after passing the gate, and a chute for delivering said last mentioned potatoes at a remote point.

7. A potato harvester comprising a pair of spaced frame members, an endless belt extending therebetween and permeable to objects of smaller size than the potatoes to be harvested, means for driving the belt, a plow adapted to discharge to the belt at its forward end potatoes and soil raised by the plow as it is drawn along the row, the belt rearwardly from said point of discharge extending upwardly at an angle less than the angle of repose of the potatoes thereon and thence more sharply upwardly at an angle greater than said angle of repose, means extending across the more sharply inclined portion of the belt forming a gate enabling potatoes to pass beneath it as they are carried upwardly by the belt and also forming receiving means for potatoes falling from the belt after passing the gate, and a chute for delivering said last mentioned potatoes at a remote point, said gate forming means and chute being disposed at an angle less than the more sharply inclined portion of the belt but still greater than the angle of repose of potatoes when lying thereon whereby said potatoes move by gravity into and through the chute.

8. In a potato harvester comprising a conveyor having a rear portion inclined at an angle greater than the angle of repose of potatoes lying thereon, means for driving the conveyor, and means for progressively digging the potatoes and delivering them to the forward portion of the conveyor as the harvester is moved along the row, means extending transversely of the rear portion of the conveyor forming both a gate for passing potatoes traveling with the conveyor and means for receiving potatoes falling from the conveyor after passing the gate.

9. In a potato harvester comprising a conveyor having a rear portion inclined at an angle greater than the angle of repose of potatoes lying thereon, means for driving the conveyor, and means for progressively digging the potatoes and delivering them to the forward portion of the conveyor as the harvester is moved along the row, means extending transversely of the rear portion of the conveyor forming both a gate for passing potatoes traveling with the conveyor and means for receiving potatoes falling from the conveyor after passing the gate, said gate forming means lying at an angle less than that of the rear portion of the conveyor but greater than the angle of repose of potatoes lying on said means.

ALFRED STAUFFER.

REFERENCES CITED

The following references are of record in the file of this patent:

UNITED STATES PATENTS

| Number | Name | Date |
|---|---|---|
| 1,520,577 | Kendall | Dec. 23, 1924 |

FOREIGN PATENTS

| Number | Country | Date |
|---|---|---|
| 25,450 | Great Britain | of 1908 |
| 23,747 | Great Britain | of 1910 |
| 396,365 | Germany | May 30, 1924 |